(12) United States Patent
Kindstrand et al.

(10) Patent No.: US 10,221,523 B2
(45) Date of Patent: *Mar. 5, 2019

(54) MULTI-PASS CRIMP COLLAR FOR A LOOPED CABLE

(71) Applicant: Schlage Lock Company LLC, Carmel, IN (US)

(72) Inventors: Daniel H. Kindstrand, Tucson, AZ (US); Donald H. Warren, Natick, MA (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/824,485

(22) Filed: Nov. 28, 2017

(65) Prior Publication Data

US 2018/0179702 A1 Jun. 28, 2018

Related U.S. Application Data

(63) Continuation of application No. 14/558,230, filed on Dec. 2, 2014, now Pat. No. 9,828,724.

(Continued)

(51) Int. Cl.
*F16G 11/00* (2006.01)
*D07B 1/18* (2006.01)
*F16G 11/02* (2006.01)

(52) U.S. Cl.
CPC ............... *D07B 1/18* (2013.01); *F16G 11/02* (2013.01); *Y10T 24/3907* (2015.01); *Y10T 29/49817* (2015.01); *Y10T 29/49925* (2015.01)

(58) Field of Classification Search
CPC ... D07B 1/18; Y10T 403/4354; Y10T 24/398; Y10T 403/4983; F16G 11/02; F16G 11/025
See application file for complete search history.

(56) References Cited

U.S. PATENT DOCUMENTS 1,422,660 A 7/1922 Bump
1,596,818 A * 8/1926 Dowd .................... D07B 9/00
174/94 R (Continued)

FOREIGN PATENT DOCUMENTS

CN 201461852 U 5/2010
EP 2610035 A1 * 7/2013 ............. B25B 25/00

(Continued)

OTHER PUBLICATIONS

International Search Report; International Application No. PCT/US2014/068226; dated Apr. 15, 2015; 5 pages.

(Continued)

*Primary Examiner* — Jason W San
(74) *Attorney, Agent, or Firm* — Taft Stettinius & Hollister LLP

(57) ABSTRACT

A cable assembly including a collar and a cable. The collar includes a first opening, a second opening and a third opening, each of which extends through the collar along a longitudinal dimension of the collar. The cable includes a looped end and a first cable segment extending through the first opening, a second cable segment extending through the second opening, a third cable segment extending into the third opening, and a fourth cable segment forming a loop between the first and second cable segments. The collar is crimped or swaged to the cable and is securely engaged with the first, second and third segments of the cable.

20 Claims, 3 Drawing Sheets

Related U.S. Application Data

(60) Provisional application No. 61/910,874, filed on Dec. 2, 2013.

(56) References Cited

U.S. PATENT DOCUMENTS

| | | | | |
|---|---|---|---|---|
| 1,835,068 A * | 12/1931 | Livermore | D03C 9/0683 | 16/206 |
| 1,886,247 A * | 11/1932 | Cole | F16G 11/12 | 24/122.3 |
| 2,212,670 A * | 8/1940 | Murray | F16G 11/02 | 403/391 |
| 2,217,400 A * | 10/1940 | Gallagher | F16G 11/025 | 403/308 |
| 2,304,306 A * | 12/1942 | Hobbs, Jr. | B66C 1/12 | 294/74 |
| 2,348,975 A * | 5/1944 | Hohwart | F16G 11/025 | 24/115 R |
| 2,480,543 A * | 8/1949 | Brooks | B65D 77/185 | 24/115 A |
| 2,492,690 A | 12/1949 | Diamond | | |
| 2,529,176 A * | 11/1950 | Newell, Jr. | H02K 3/51 | 24/115 A |
| 2,561,487 A * | 7/1951 | Bailhe | B63B 21/20 | 114/230.26 |
| 2,849,771 A | 9/1958 | Rohland | | |
| 2,883,220 A * | 4/1959 | Johnson | H01R 4/16 | 174/84 C |
| 2,889,603 A * | 6/1959 | Joy | F16G 11/02 | 174/90 |
| 2,895,195 A * | 7/1959 | Ehmann | F16G 11/02 | 16/108 |
| 2,936,499 A * | 5/1960 | Rohland | F16G 11/02 | 403/212 |
| 2,938,069 A * | 5/1960 | Toedtman | H01R 4/186 | 174/71 R |
| 2,983,976 A * | 5/1961 | Ehmann | F16G 11/02 | 24/129 W |
| 3,022,370 A * | 2/1962 | Osborn | H01R 4/186 | 174/71 R |
| 3,082,500 A * | 3/1963 | Moreau | F16G 11/02 | 24/115 A |
| 3,088,993 A * | 5/1963 | Matthysse | H01R 4/186 | 174/71 R |
| 3,156,764 A * | 11/1964 | Toedtman | H01R 4/186 | 174/71 R |
| 3,221,383 A * | 12/1965 | Bilodeau | F16G 11/02 | 24/130 |
| 3,236,938 A * | 2/1966 | Toedtman | H01R 4/186 | 174/71 R |
| 3,322,888 A * | 5/1967 | Zemels | H01R 4/186 | 174/71 R |
| 3,330,903 A * | 7/1967 | Holke | H01R 4/186 | 174/71 R |
| 3,338,046 A * | 8/1967 | Baur | D07B 1/18 | 294/74 |
| 3,354,517 A * | 11/1967 | Levinsky | F16G 11/02 | 174/71 R |
| 3,367,102 A * | 2/1968 | Meger | D07B 1/18 | 403/212 |
| 3,416,197 A * | 12/1968 | Mark | F16G 11/02 | 24/115 A |
| 3,490,106 A * | 1/1970 | Dohmeier | F16G 11/02 | 24/129 W |
| 3,522,961 A * | 8/1970 | Cave, Sr. | F16G 11/02 | 174/79 |
| 3,527,487 A * | 9/1970 | Payne | F16G 11/02 | 24/122.6 |
| 3,756,008 A * | 9/1973 | Smith | B21F 3/02 | 140/149 |
| 3,858,848 A * | 1/1975 | MacFetrich | H02G 1/081 | 15/104.33 |
| 3,934,397 A * | 1/1976 | Black | D07B 7/165 | 57/202 |
| 4,000,557 A * | 1/1977 | Bawden | B21F 15/06 | 24/115 A |
| 4,019,241 A * | 4/1977 | Logan | G02B 6/3801 | 174/84 R |
| 4,093,292 A * | 6/1978 | Marcet | B66C 1/12 | 294/74 |
| 4,112,551 A * | 9/1978 | Sales | A45C 13/1046 | 24/136 B |
| 4,114,360 A * | 9/1978 | Emmons | D07B 1/18 | 57/202 |
| 4,131,377 A | 12/1978 | Rohland | | |
| 4,131,759 A * | 12/1978 | Felkel | H01B 7/04 | 138/130 |
| 4,136,987 A * | 1/1979 | Tettamanti | F16G 11/02 | 403/212 |
| 4,157,602 A * | 6/1979 | Pennell | E05B 73/0005 | 24/122.3 |
| 4,912,816 A * | 4/1990 | Brandt | B63B 21/00 | 114/230.26 |
| 4,940,856 A * | 7/1990 | Bock | H01R 4/186 | 174/84 C |
| 5,070,712 A * | 12/1991 | Fox | E05B 67/003 | 70/18 |
| 5,103,068 A * | 4/1992 | Schrader | H01R 4/186 | 174/71 R |
| 5,200,576 A * | 4/1993 | Schrader | H01R 4/186 | 174/71 R |
| 5,339,498 A * | 8/1994 | Parsons | B63B 21/08 | 24/115 M |
| 5,727,833 A * | 3/1998 | Coe | B66C 1/12 | 294/74 |
| 5,816,094 A * | 10/1998 | Birks | F16G 11/02 | 72/416 |
| 6,099,553 A * | 8/2000 | Hart | A61B 17/0487 | 24/115 A |
| 6,109,074 A * | 8/2000 | Du | E05B 67/003 | 70/18 |
| 6,170,145 B1 * | 1/2001 | Lucas | B21F 15/06 | 29/282 |
| 6,345,847 B1 * | 2/2002 | Dreisbach | G09F 3/0352 | 292/252 |
| 6,452,103 B1 * | 9/2002 | Piriz | H01R 4/186 | 174/71 R |
| 7,131,298 B1 * | 11/2006 | Haraughty | B62H 5/003 | 70/18 |
| 7,150,757 B2 * | 12/2006 | Fallin | A61B 17/0487 | 606/232 |
| 7,165,436 B2 * | 1/2007 | Bitz | H01R 4/186 | 29/751 |
| 7,183,489 B2 * | 2/2007 | Kossak | H01R 4/186 | 174/840 |
| 7,302,859 B2 * | 12/2007 | Mamie | B60P 7/0823 | 73/831 |
| 7,462,081 B2 * | 12/2008 | Kato | H01R 4/183 | 174/84 C |
| 7,637,549 B2 * | 12/2009 | Hess | B66C 1/18 | 294/74 |
| 7,655,863 B2 * | 2/2010 | Kossak | H01R 4/186 | 174/840 |
| 8,201,309 B1 * | 6/2012 | Franta | B63B 21/04 | 24/129 R |
| 8,525,033 B2 * | 9/2013 | Grether | D07B 1/02 | 174/128.1 |
| 8,533,917 B2 * | 9/2013 | Kohler | F16G 11/046 | 24/115 R |
| 8,881,521 B2 * | 11/2014 | Browne | D07B 1/0673 | 57/237 |
| 8,966,737 B2 * | 3/2015 | Rohland | B21F 15/06 | 24/114.5 |
| 9,003,757 B2 * | 4/2015 | Mozsgai | B66C 1/12 | 57/201 |
| 9,157,505 B2 * | 10/2015 | Seader | F16G 11/10 | |
| 9,470,021 B2 * | 10/2016 | Kindstrand | E05B 73/0005 | |
| 9,562,321 B2 * | 2/2017 | Manabe | D07B 1/18 | |

(56) References Cited

U.S. PATENT DOCUMENTS

| | | | | |
|---|---|---|---|---|
| 9,828,724 B2* | 11/2017 | Kindstrand | | D07B 1/18 |
| 2004/0032372 A1* | 2/2004 | McKim | | H01Q 1/34 |
| | | | | 343/709 |
| 2007/0063522 A1* | 3/2007 | Byrne | | B66C 1/12 |
| | | | | 294/74 |
| 2008/0276664 A1* | 11/2008 | Shu | | B62H 5/003 |
| | | | | 70/18 |
| 2010/0160957 A1* | 6/2010 | Kirkham | | A61B 17/1322 |
| | | | | 606/203 |
| 2011/0009876 A1* | 1/2011 | McAlister | | A61B 17/221 |
| | | | | 606/128 |
| 2011/0308049 A1* | 12/2011 | Sun | | B65D 63/1027 |
| | | | | 24/306 |
| 2012/0137475 A1* | 6/2012 | Seader | | F16G 11/10 |
| | | | | 24/129 R |
| 2014/0137388 A1* | 5/2014 | Campbell | | F16G 11/025 |
| | | | | 29/461 |
| 2014/0196256 A1* | 7/2014 | Garcia | | F16G 11/046 |
| | | | | 24/129 R |
| 2014/0212213 A1* | 7/2014 | Meyers | | F16B 7/0433 |
| | | | | 403/396 |
| 2015/0026930 A1* | 1/2015 | Schmitz | | F16G 11/06 |
| | | | | 24/115 K |
| 2015/0096159 A1* | 4/2015 | Cawood | | H01R 4/183 |
| | | | | 29/235 |
| 2015/0176678 A1* | 6/2015 | Burrell | | F16G 11/046 |
| | | | | 24/129 R |
| 2015/0233446 A1* | 8/2015 | Disantis | | F16G 11/02 |
| | | | | 29/428 |
| 2016/0066654 A1* | 3/2016 | Seader | | F16G 11/10 |
| | | | | 24/712.9 |
| 2017/0002513 A1* | 1/2017 | Kirth | | B66B 7/062 |
| 2017/0029055 A1* | 2/2017 | Chen | | B62H 5/14 |

FOREIGN PATENT DOCUMENTS

| | | |
|---|---|---|
| EP | 2610035 A1 | 7/2013 |
| FR | 2407886 A1 | 6/1979 |

OTHER PUBLICATIONS

Written Opinion of the International Search Authority; International Application No. PCT/US2014/068226; dated Apr. 15, 2015; 7 pages.

* cited by examiner

MULTI-PASS CRIMP COLLAR FOR A LOOPED CABLE

CROSS REFERENCE TO RELATED APPLICATIONS

The present application is a continuation of U.S. patent application Ser. No. 14/558,230 filed on Dec. 2, 2014 and issued as U.S. Pat. No. 9,828,724, which claims the benefit of U.S. Provisional Application No. 61/910,874 filed on Dec. 2, 2013, the contents of each application hereby incorporated herein by reference in their entirety.

TECHNICAL FIELD

The present invention generally relates to cables having looped ends, and more particularly, but not exclusively, relates to looped security cables.

BACKGROUND

Cables having looped ends are sometimes used as theft-preventing cables or load-bearing slings. The looped ends of some security cables are held in place by a crimping collar. In many looped cables, the point of failure is commonly the connection between the cable and the collar, as the cable itself can withstand a higher pull-test value than the connection. Therefore, a need remains for further improvements in systems and methods for looped security cables.

SUMMARY

A cable assembly according to one embodiment includes a cable and a collar. The collar includes a first opening, a second opening and a third opening, each of which extends through the collar along a longitudinal dimension of the collar. The cable includes a looped end and a first cable segment extending through the first opening, a second cable segment extending through the second opening, a third cable segment extending into the third opening, and a fourth cable segment forming a loop between the first and second cable segments. The collar is crimped or swaged to the cable and is securely engaged with the first, second and third segments of the cable.

DETAILED DESCRIPTION OF ILLUSTRATIVE EMBODIMENTS

Figure 1:
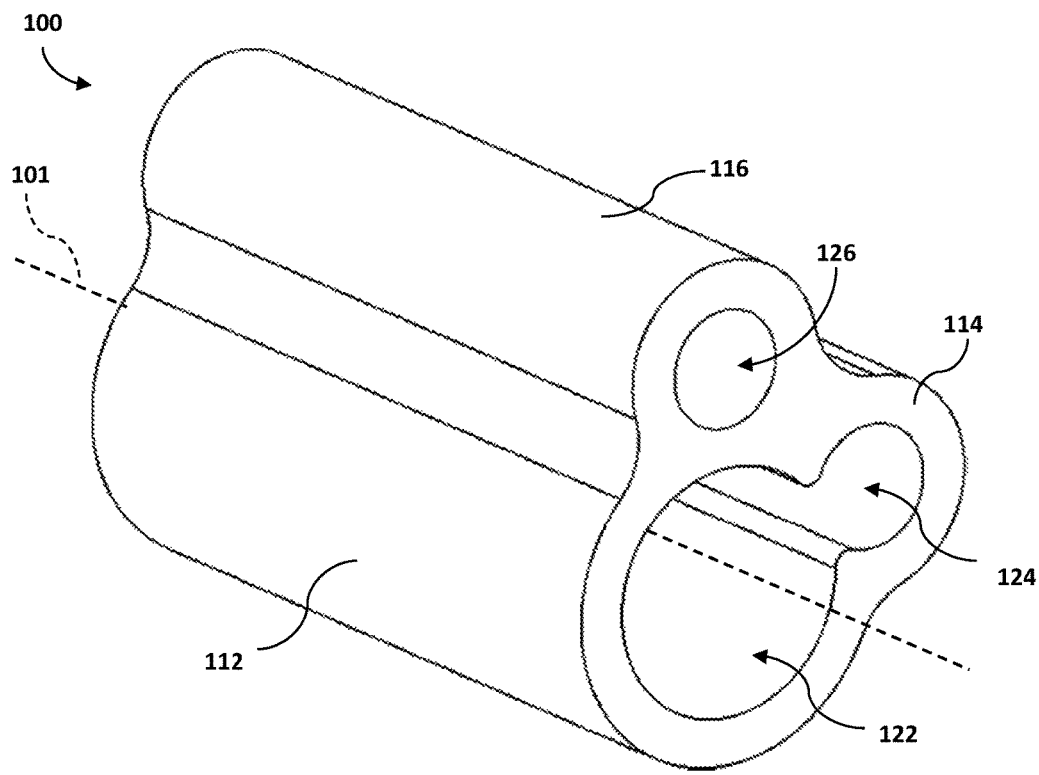
FIG. 1 illustrates a crimp collar according to one embodiment.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a collar 100 according to one form of the invention includes first, second and third collar portions 112, 114, 116 which respectively define first, second and third openings 122, 124, 126 extending therethrough. The illustrated openings 122, 124, 126 are sized and shaped to receive portions of a cable having a substantially circular outer cross-section. Accordingly, each of the openings 122, 124, 126 has a substantially circular cross-section. In other embodiments, one or more of the openings 122, 124, 126 may have a non-circular cross-section. While other forms are contemplated, the openings 122, 124, 126 extend in an axial direction that is substantially parallel to a longitudinal axis 101 of the collar 100. In the illustrated embodiment, the first and second openings 122, 124 are connected to and in transverse communication with one another, and are not connected to or in transverse communication with the third opening 126. Additionally, in the illustrated embodiment, the first opening 122 has a greater inner diameter $d_i$ than the inner diameters $d_i$ of each of the second and third openings 124, 126, and the second and third openings 124, 126 have substantially the same or similar inner diameters $d_i$.

Figure 2:
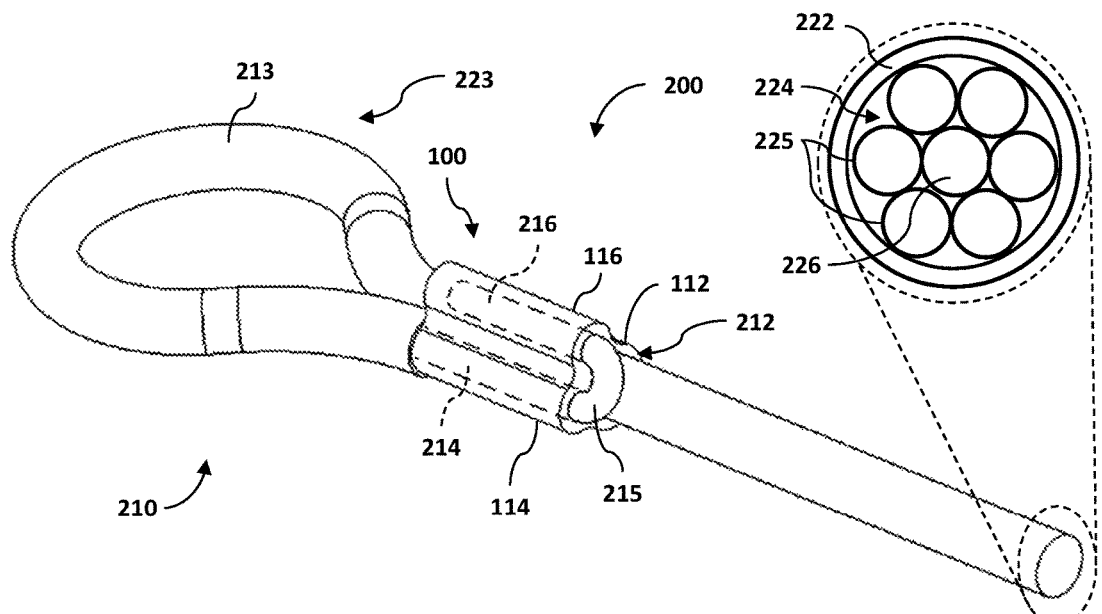
FIG. 2 illustrates a looped cable assembly including the crimp collar of FIG. 1.

With reference to FIG. 2, illustrated therein is a looped cable assembly 200 including the collar 100 and a cable 210. The cable 210 includes coated cable segments 212, 213 having a plastic outer coating 222 surrounding a wire rope 224, and bare cable segments 214, 216 which include the wire rope 224 without the outer coating 222. In the collar 100, the inner diameter $d_i$ of the first opening 122 corresponds to the outer diameter $d_o$ of the coated cable segments 212 (including the outer coating 222), and the inner diameter $d_i$ of second and third openings 124, 126 corresponds to the outer diameter $d_o$ of the wire rope 224 (without the outer coating 222). In one form, the wire rope 224 includes a central inner core 226, and six groups 225 of braided or twisted wires surrounding the inner core 226. In some embodiments, the central core 226 may be a solid core. However, in other embodiments, the central core 226 may itself comprise a group of braided or twisted wires.

At an initial stage of manufacturing, the cable 210 may include the coating 222 along its entire length. During manufacture of the looped cable assembly 200, a portion of the cable 210 may be stripped of the outer coating 222 to expose the wire rope 224. The cable 210 may then be passed through the collar 100 three times. In the first pass, the cable 210 is passed through the first opening 122 such that the first coated cable segment 212 is positioned in the first collar portion 112. The second coated cable segment 213 is then bent or wrapped back toward the collar 100, thereby forming a cable loop 223. In the second pass, the exposed wire rope 224 is passed through the second opening 124 such that the first bare cable segment 214 is positioned in the second collar portion 114. The second bare cable segment 216 is then bent or wrapped back toward the collar 100, thereby forming a cable turn or elbow 215. In the third pass, the exposed wire rope 224 is passed into or through the third opening 126 such that the second bare cable segment 216 is positioned in the third collar portion 116. Once the three passes have been completed, the collar 100 is deformed to securely engage the collar 100 with the cable 210 such as, for example, by a mechanical crimping press. With the collar 100 deformed, the first collar portion 112 directly engages the outer coating 222 of the cable 210, and the second and third collar portions 114, 116 directly engage the outer wire groups 225 of the wire rope 224. It is also contemplated that the collar 100 may be deformed in any other suitable manner such as, for example, by crushing or swaging.

When an excessive tensile force is applied to the looped cable assembly 200, the crimp or swage is stressed, and may in some circumstances begin to fail. In such case, the first bare cable segment 214 may begin to slip or slide out of the first collar portion 114. This in turn results in a tightening of the cable turn or elbow 215, which may be positioned along an axis arranged substantially perpendicular to axes of the second and third openings 124, 126. When this occurs, the tensile force in the cable 200 must be translated from the first bare cable segment 214 to the now straightened elbow 215, and from the elbow 215 to the second bare cable segment 216. Because both the first and second bare cable segments 214, 216 are arranged substantially orthogonal to the elbow 215, much of the tensile force is countered by frictional forces between the collar 100 and the wire rope 224 at the bends between the elbow 215 and the first and second bare cable segments 214, 216. As a result, the amount of force that must be countered by the engagement between the third collar portion 116 and the second bare cable segment 216 is greatly reduced, thereby increasing the amount of tensile force that the cable 200 can endure without collar failure. Thus, it should be appreciated that the looped cable 200 can provide a greater holding force than traditional looped cables. This added strength increases the pull force required to break the swage or crimp, thereby resulting in an increased amount of weight that can be lifted or towed using the looped cable 200 such as, for example, when used as a sling, and/or resulting in improved security such as, for example, when used as a cable.

Figure 3:
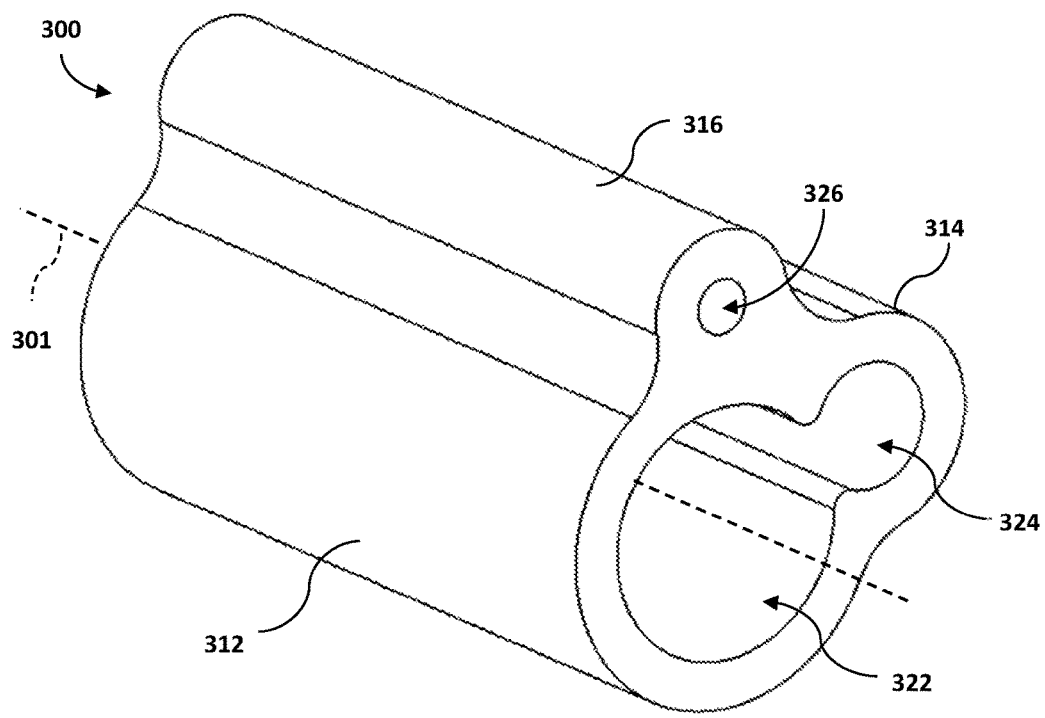
FIG. 3 illustrates a crimp collar according to another embodiment.
Figure 4:
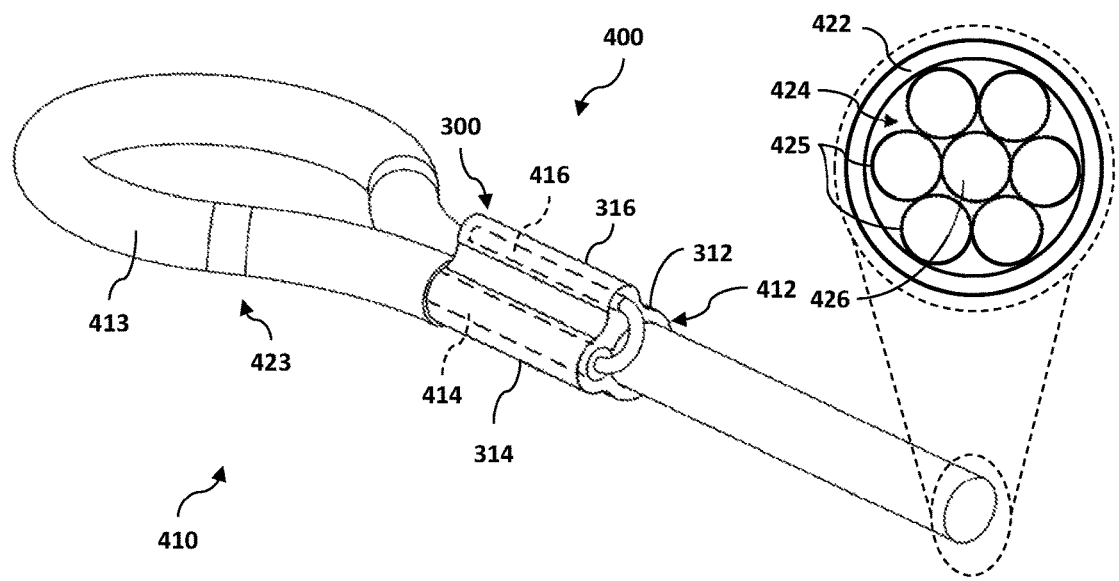
FIG. 4 illustrates a looped cable assembly including the crimp collar of FIG. 3.

With reference to FIGS. 3 and 4, shown therein is a looped cable assembly 400 according to a second embodiment which includes a collar 300 and a cable 410. The cable 410 includes first and second coated cable segments 412, 413, a bare rope cable segment 414, and a bare core segment 416. The coated cable segments 412, 413 include a plastic outer coating 422 surrounding a wire rope 424 having a central core 426 and a plurality of braided or twisted wire groups 425 positioned about the central core 426. The bare rope cable segment 414 includes the wire rope 424, but does not include the outer coating 422. The bare core segment 416 includes the central core 426, but does not include the wire groups 425 or the outer coating 422. In the illustrated embodiment, the central core 426 is a solid core consisting of a single flexible wire. However, it is also contemplated that the central core 426 may comprise a group of braided or twisted wires, which may be the same as or similar to the wire groups 425 which surround the central core 426.

The collar 300 includes first, second and third collar portions 312, 314, 316 respectively defining first, second and third openings 322, 324, 326 extending through the collar 300. The first opening 322 has an inner diameter $d_i$ corresponding to the outer diameter $d_o$ of the cable 410 (including the coating 422). The second opening 324 has an inner diameter $d_i$ corresponding to the outer diameter $d_o$ of the wire rope 424. The third opening 326 has an inner diameter $d_i$ corresponding the outer diameter $d_o$ of the central core 426. While other forms are contemplated, the illustrated openings 322, 324, 326 extend axially along the collar 300 in a direction substantially parallel to a longitudinal axis 301 of the collar 300.

The looped cable assembly 400 may be manufactured in a manner similar to that described above with regard to FIGS. 1 and 2. In one form, a portion of the cable 410 is stripped of the outer coating 422, thereby exposing the wire rope 424, and a portion of the wire rope 424 is stripped of the outer wire groups 425, thereby exposing the central core 426. The cable 410 may then be passed through the collar 300 three times. In the first pass, the cable 410 is passed through the first opening 322 such that the first coated cable segment 412 is positioned in the first collar portion 312. The second coated cable segment 413 is then bent or wrapped back toward the collar 300, thereby forming a loop 423. In the second pass, the bare rope cable segment 414 is passed through the second opening 324 such that the bare rope cable segment 414 is positioned in the second collar portion 314. In the third pass, the exposed central core 426 is passed into or through the third opening 326 such that the bare core segment 416 is positioned in the third collar portion 316. Once the three passes have been completed, the collar 300 may be deformed to engage the collar 300 with the cable 410 such as, for example, by swaging or a mechanical press. With the collar 300 deformed, the first collar portion 312 directly engages the outer coating 422, the second collar portion 314 directly engages the outer wire groups 425 of the wire rope 424, and the third collar portion 316 directly engages the central core 426.

Figure 5:
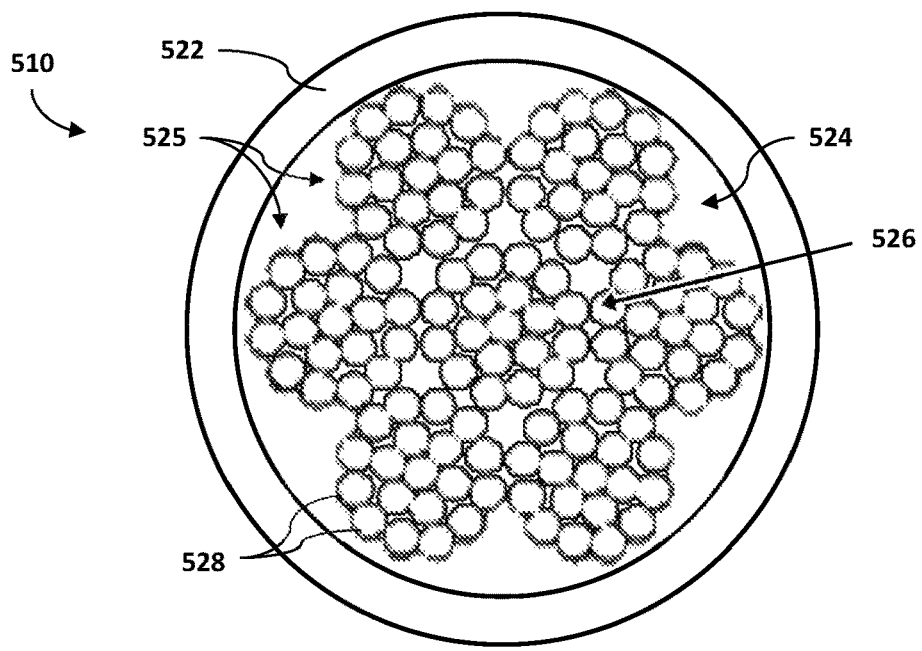
FIG. 5 is a cross-sectional illustration of a braided cable including a braided core.
Figure 6:
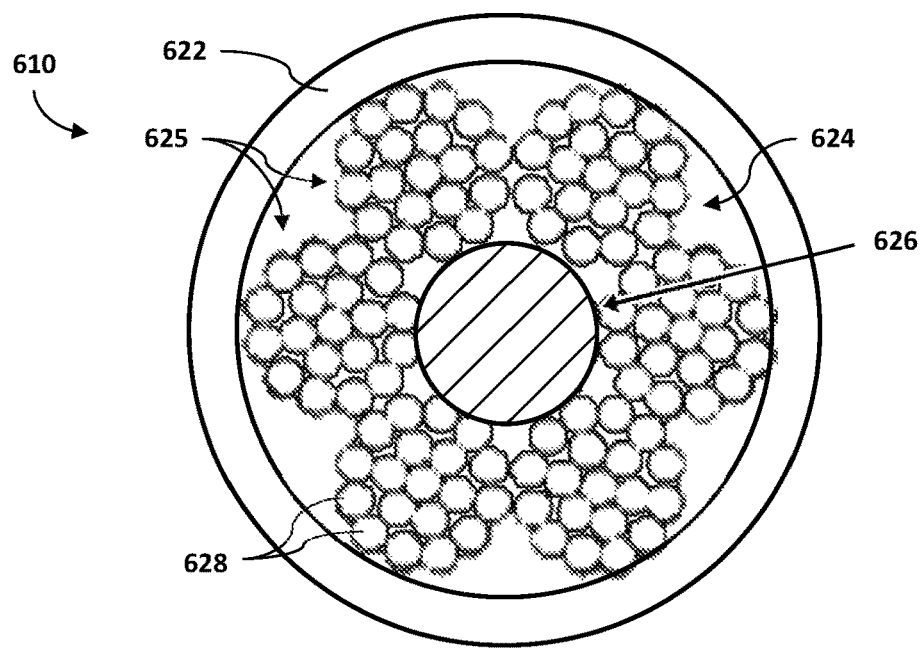
FIG. 6 is a cross-sectional illustration of a braided cable including a solid core.

FIGS. 5 and 6 illustrate two exemplary forms of a coated cable which may be utilized in combination with the collars 100, 300 to form the looped cable assemblies 200, 400. With specific reference to FIG. 5, one form of a coated cable 510 includes an outer coating layer 522 surrounding a wire rope 524, with the wire rope 524 including a plurality of wire groups 525 positioned about a central core 526. Each of the wire groups 525 and the central core 526 includes a plurality of wires 528 which are braided or twisted together. With specific reference to FIG. 6, another form of a coated cable 610 includes an outer coating layer 622 surrounding a wire rope 624, with the wire rope 624 including a plurality of wire groups 625 positioned about a central core 626. Each of the wire groups 625 include a plurality of wires 628 which are braided or twisted together, and the central core 626 is a solid core which may be configured as a single wire having a greater outer diameter $d_o$ than the outer diameter $d_o$ of the individual wires 628. In certain forms, the central core may have an outer diameter $d_o$ corresponding to that of the wire groups 625.

While illustrative forms of a three-pass looped cable have been described, other forms are also contemplated as falling within the scope of the invention. For example, certain embodiments may include the exposed wire rope positioned within the first two collar openings, and an exposed solid core wire or a braided/twisted core wire positioned in the third collar opening. In other embodiments, the cable need not necessarily include a plastic coating, and the cable may consist essentially of the wire rope.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method of forming a looped cable from a cable and a collar, comprising:
   positioning a first segment of the cable in a first opening of the collar;
   positioning a second segment of the cable in a second opening of the collar;
   positioning a third segment of the cable in a third opening of the collar;
   forming a cable turn between the second and third segments of the cable;
   forming a loop with a fourth segment of the cable; and
   deforming the collar to a deformed state which engages the first, second and third segments of the cable, thereby substantially preventing movement of the first, second and third segments of the cable relative to the collar and securing the cable turn in a fixed orientation.

2. The method of claim 1, wherein the deforming the collar includes at least one of crimping and swaging the collar.

3. The method of claim 1, wherein the cable includes a wire rope and an outer coating, the method further comprising removing the coating from the second and third segments of the cable prior to the deforming, while retaining the coating on the first and fourth segments.

4. The method of claim 3, further comprising removing a plurality of wire groups from the third segment of the cable prior to the deforming.

5. The method of claim 1, wherein with the collar deformed, the cable defines a path sequentially comprising the first segment, the fourth segment, the second segment, the cable turn, and the third segment; and
   wherein the path extends through the first opening in a first direction, extends through the second opening in a second direction different from the first direction, and extends into the third opening in a third direction different from the second direction.

6. The method of claim 5, wherein the third direction is opposite the second direction.

7. The method of claim 1,
   wherein the cable further comprises an outer coating on the first and fourth cable segments but not on the second and third cable segments.

8. The method of claim 7, wherein the cable further comprises a wire rope, the outer coating surrounding the first and fourth cable segments.

9. The method of claim 8, wherein the wire rope includes a central core and a plurality of wire groups positioned about the central core; and
   wherein the second cable segment includes the central core and the plurality of wire groups, and wherein the third cable segment includes at least the central core.

10. The method of claim 9, wherein the third cable segment further includes the plurality of wire groups and wherein the collar is directly engaged with the outer coating of the first cable segment and the wire groups of the second and third cable segments.

11. The method of claim 9, wherein the third cable segment does not include the plurality of wire groups, and wherein the collar is directly engaged with the outer coating of the first cable segment, the wire groups of the second cable segment, and the central core of the third cable segment.

12. The method of claim 9, wherein the central core comprises a solid core consisting essentially of a single wire having an outer diameter corresponding to an outer diameter of each of the wire groups.

13. The method of claim 7, wherein each of the openings extends in a direction substantially parallel to a longitudinal axis of the collar.

14. The method of claim 7, wherein the first opening is connected to and in transverse communication with the second opening.

15. A method, comprising:
   providing a single-piece, monolithic collar including a first portion defining a first opening having a first inner diameter, a second portion defining a second opening having a second inner diameter, and a third portion defining a third opening having a third inner diameter;
   providing a cable including a first cable segment having a first outer diameter corresponding to the first inner diameter of the first opening, a second cable segment having a second outer diameter corresponding to the second inner diameter of the second opening, a third cable segment having a third outer diameter corresponding to the third inner diameter of the third opening, and a fourth cable segment connecting the first and second cable segments;
   positioning the first cable segment in the first opening;
   forming a loop with the fourth cable segment;
   positioning the second cable segment in the second opening;
   positioning the third cable segment in the third opening; and
   deforming the collar such that the first portion securely engages the first cable segment, the second portion securely engages the second cable segment, and the third portion securely engages the third cable segment.

16. The method of claim 15, wherein the providing the cable includes providing a coated cable including wire rope and an outer coating surrounding the wire rope, the wire rope including a central core and a plurality of wire groups positioned about the central core, and wherein the coated cable has the first outer diameter.

17. The method of claim 16, wherein the providing the cable further comprises removing the outer coating from the second and third cable segments, and wherein the wire rope has the second outer diameter.

18. The method of claim 17, wherein the second outer diameter is equal to the third outer diameter.

19. The method of claim 17, wherein the providing the cable further comprises removing the wire groups from the third cable segment, and wherein the central core has the third outer diameter.

20. The method of claim 15, wherein the first, second and third openings in the collar extend along a direction substantially parallel to a longitudinal axis of the collar; and
   wherein the first and third directions are opposite the second direction.

* * * * *